United States Patent [19]

Wilson

[11] Patent Number: 4,470,610
[45] Date of Patent: Sep. 11, 1984

[54] CHILDREN'S SAFETY PULL TOY

[76] Inventor: Everett E. Wilson, 2822 W. Ironwood Dr., Traverse City, Mich. 49684

[21] Appl. No.: 469,795

[22] Filed: Feb. 25, 1983

[51] Int. Cl.$^3$ ............................................. B62B 7/02
[52] U.S. Cl. .................................... 280/47.25; 188/20; 280/47.2; 280/63; 280/7.14
[58] Field of Search ............ 280/47.37 R, 79.2, 47.25, 280/7.14, 47.38, 47.35, 47.19, 63, 12 AB, 289 WC; 188/9, 19, 20, 74, 2 F, 29, 8; 248/619, 633, 635; 297/307, 455; 267/131, 132, 133

[56] References Cited

U.S. PATENT DOCUMENTS

| | | | |
|---|---|---|---|
| 147,048 | 2/1974 | Doremus | 267/131 |
| 521,868 | 6/1894 | Shay | 280/47.25 |
| 997,531 | 7/1911 | Wright | 188/9 |
| 1,246,721 | 11/1917 | Crawford | 280/47.25 |
| 1,259,466 | 3/1918 | Turner | 280/47.25 |
| 2,597,252 | 5/1952 | McKinney | 267/133 |
| 2,680,472 | 6/1954 | Hempe | 267/132 |
| 3,998,476 | 12/1976 | Kazmarr | 280/47.37 R |
| 4,232,898 | 11/1980 | Bodrero | 297/219 |
| 4,337,957 | 7/1982 | Heine | 280/7.14 |

FOREIGN PATENT DOCUMENTS

| | | | |
|---|---|---|---|
| 72722 | 6/1941 | Norway | 280/7.14 |
| 313896 | 6/1956 | Switzerland | 280/47.25 |
| 197256 | 5/1923 | United Kingdom | 280/47.37 R |

Primary Examiner—David M. Mitchell
Attorney, Agent, or Firm—Dolgorukov & Dolgorukov

[57] ABSTRACT

A children's safety pull toy is shown having a frame member upon which is mounted a single fixed axle having a pair of wheels freely rotatable thereon for movement. A seat unit of sufficient size for one child to ride therein is mounted to said frame member, and a tongue designed to be pulled by one or more children is a portion of said frame member. A safety bar is attached to at least the rear of the frame member, while suitable braking means, both of the foot and hand operated variety, operable by the child riding in the cart, provide for sure and safe stopping of the cart should the children pulling the cart operate it in too fast a manner. A safety belt may be provided to hold the child in the cart, while a shoulder strap may be provided to provide extra support for the one or more children pulling the cart. The wheels of the cart may be replaced by skis for operation over snow.

11 Claims, 7 Drawing Figures

CHILDREN'S SAFETY PULL TOY

The present invention relates to children's toys and, more particularly, to children's pull toys of the type in which it is intended for one or more children to pull another.

I have for many years sought to provide a children's toy in which a child may ride and be pulled by one or more other children in safety. I have now developed such a toy, which I prefer to call a "Kiddy-Cart", which I believe provides safety features such that, even if the toy is operated by youngsters on occasion in a reckless matter, prevents injuries from occurring. I have done this by providing a frame member means to which is mounted a fixed axle having wheels rotatably mounted thereon, and a seat, which may have a substantial amount of cushioning, such that my Kiddy-Cart can be pulled over rough terrain without unduly shaking the occupant. An adjustable tongue provides for pulling of the device by a wide range of sizes of children, and an anti-tip bar behind the main wheels prevents my Kiddy-Cart from being overturned.

Thus, one of the objects of the present invention is to provide a children's pull toy having means to prevent the overturning thereof.

A further object of the present invention is to provide a children's pull toy which may be pulled by a wide variety of sizes of children.

A further object of the present invention is to provide a children's wheeled vehicle having hand and foot brake means to provide for safe and sure stopping of said vehicle.

A still further object of the present invention is to provide a wheeled children's pull-type vehicle having a seat floatably mounted to a chassis member of said vehicle, and having safety belt means to restrain the child in said seat.

A still further object of the present invention is to have a wheeled pull-type vehicle having anti-tip means to prevent the vehicle from being overturned.

A still further object of the present invention is to provide a vehicle of the foregoing nature, wherein said wheels may be replaced by skis to provide for operation of said vehicle on snowy terrain.

Further objects and advantages of this invention will be apparent from the following description and appended claims, reference being had to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figure 1:
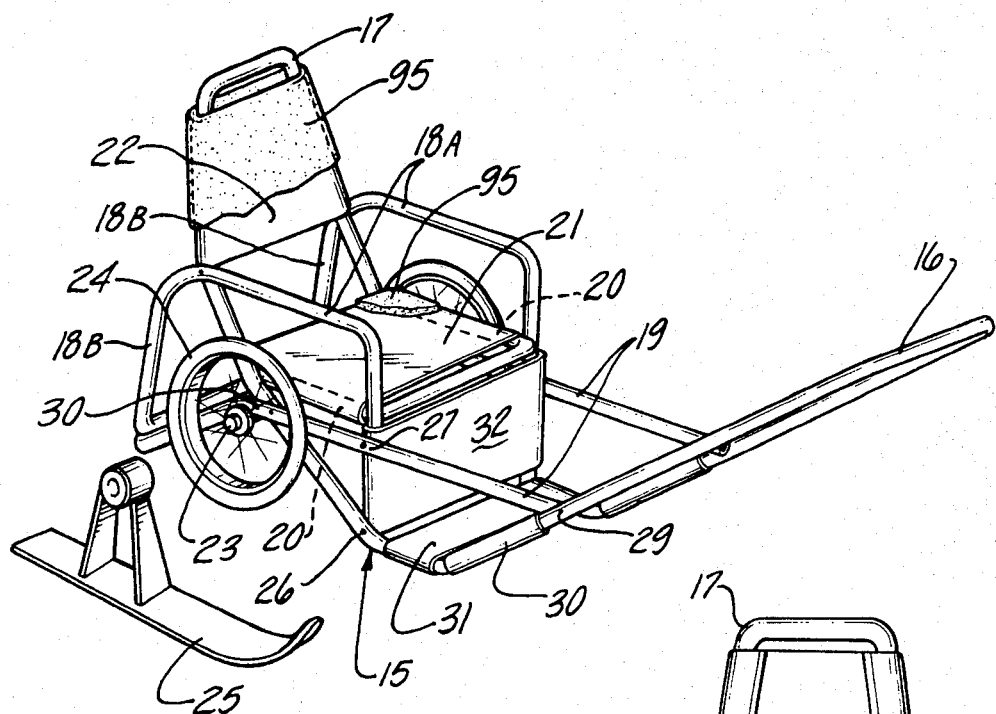
FIG. 1 is a perspective view of a children's pull toy embodying the construction of my invention, and showing one of the skis which may replace the wheels of said vehicle for operation over snowy terrain.
Figure 2:
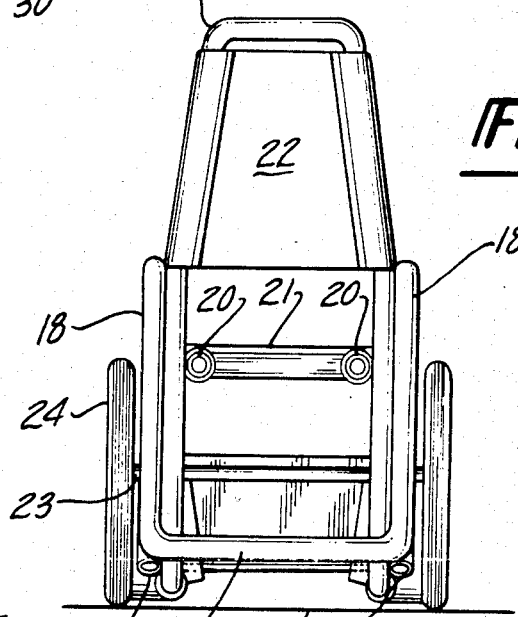
FIG. 2 is a rear elevational view of the construction shown in FIG. 1.

Referring now to FIG. 1, there is shown a perspective view of a construction embodying my invention for a children's safety pull toy. My construction includes a frame member generally designated by the numeral 15. The frame 15 has several sections, including the tongue section 16 and the seat back support section 17. A pair of arm rail and safety bars 18, having arm rail portions 18A and safety portions 18B, are mounted as shown to the frame member 15 in a parallel-spaced relationship. Also mounted in a parallel-spaced relationship between the arm rail and safety bars 18 and the frame member 17, are a pair of seat support bars 19, which are fastened in a generally horizontal position.

Although many ways are available of attaching the arm rail and safety bars 18 to the frame 15, I desire that this portion, which is of a tubular construction similar to that of the frame, be bolted to the frame by first bolt and nut assemblies 26 at one end thereof, and be suitably fastened at the other end thereof to the lower end of the seat support bars 19. The arm rail and safety bar 18 is also fastened to the seat support bars 19 by the second bolt and nut assemblies 27.

The seat support bars 19 are, in turn, attached to the frame 15 by the third and fourth bolt and nut assemblies shown at 29 and 30. It is to be understood that for ease of assembly, the preferred embodiment uses the bolt and nut assemblies. However, it is well within the scope of the present invention to use other fastening means such as sheel metal screws, weldments, etc.

Attached to the seat back support section 17 of the frame member 15 is a seat back 22, while the seat 21 is mounted between a pair of seat attachment bars 20 fixedly mounted in a generally horizontal portion between the arm rail and safety bar 18 and the seat back support 17 of frame 15. A padded, removable, slip cover 95 may be provided on the seat 21 and seat back 22 for the comfort of the child. This may be held in place by the conventional zippered or snapped construction and should be easily removable for cleaning.

The rear most section of the arm rail and safety bar 18 is formed, as the name implies, into a safety bar portion 18B which is parallel and slightly above the surface 38 on which my Kiddy-Cart is intended to travel.

An axle 23 is fixedly mounted to the frame member 15 and fixedly attached thereto by any suitable means. A pair of wheels 24 are rotatably attached, one at each end of the axle 23, for rotational movement, with the entire frame member 15 now being designed to pivot around the axle 23 by a lifting motion applied by a child on the tongue 16, to the extent permitted by the safety bar 18B. It can be seen that a relatively limited lifting of the tongue 16 can be had before the safety bar portion 18B strikes the surface 38 on which the vehicle is traveling.

To provide support for the child's feet, I have provided toe board 30 and a lower floor board 31 attached to the frame member 15. It is to be noted that the seat 21, the seat back 22, the upper floor board 30, the lower floor board 31, and the kick plate 32, have all been shown of a wrap around sheet metal construction which is well known in the art, and which generally involves wrapping the sheel metal forming these constructions around the frame member 15 and then reattaching it to itself. It should be understood, however, that any means of attaching these constructions to the frame member 15, such as welding, direct attachment by fastening means such as rivets or screws, etc., are well within the scope of the present invention.

For use in snow, one of a pair of removable skis 25 is shown in FIG. 1, which is adapted to be mounted to the axle 23 once the wheel is removed.

Figure 3:
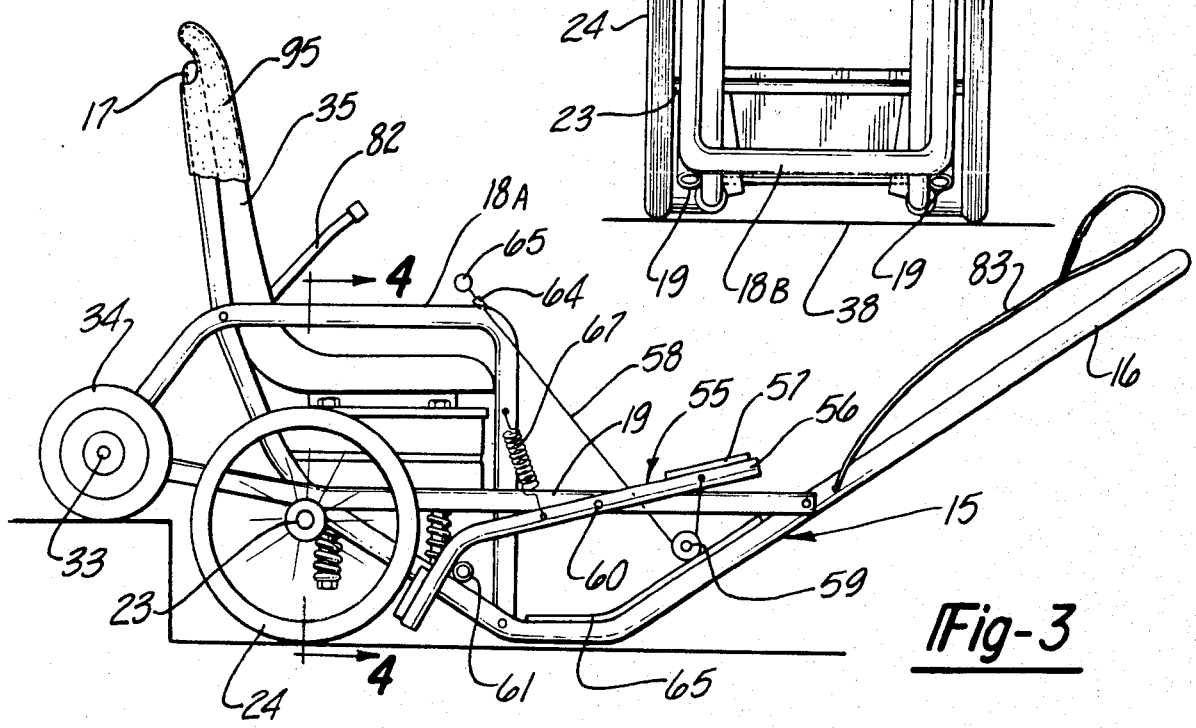
FIG. 3 is a side elevational view of a construction embodying my invention.

A modification of my invention having several additional safety features is shown in FIG. 3. For example, the safety bar portion 18B of the arm rail and safety bar 18 has been replaced by a second axle 33 on which are mounted a pair of safety wheels 34. As before, these safety wheels 34 serve the function of limiting the upward movement of the tongue 16, allowing only a limited such movement before the wheels strike the surface on which the Kiddy-Cart is traveling.

Further, depending on the exact height of the safety wheels 34, in relationship to the wheels 24, such wheels may be useful for going over curbs during the travel of my Kiddy-Cart.

The seat of my basic construction shown in FIG. 1 has also been replaced by a one-piece seat 35 molded of fiberglass, plastic or the like. As before, a removable slip cover 95 may be provided.

Figure 4:
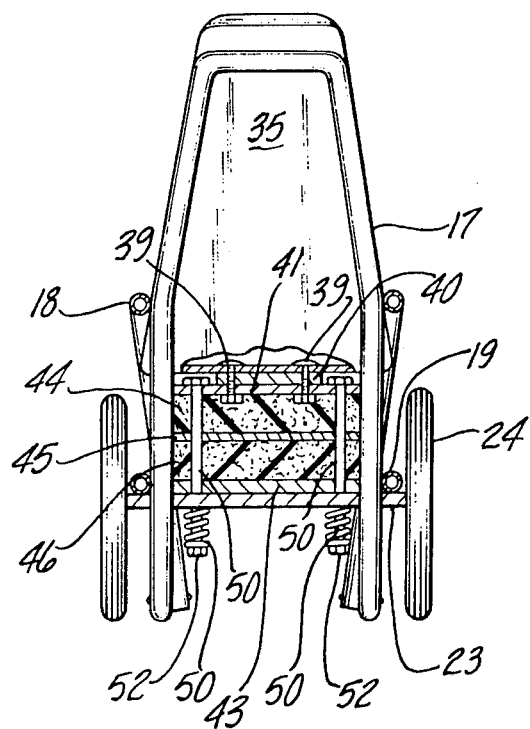
FIG. 4 is a sectional view taken in the direction of the arrows along the Section line 4—4 of FIG. 3.

In this instance, the rear of the one-piece seat 35 will rest on the seat back support section 18 of the frame member 15 and may, if desired, be suitably fastened thereto. The bottom of the one-piece seat, as more clearly shown in FIG. 4, is suitably fastened by the seat bolt and nut assemblies 39 through the seat spacer 40 to upper mounting plate 41. Interposed between the upper mounting plate 41 and the lower mounting plate 43 is an upper foam block 44, a stiffener 45 and a lower foam block 46. This assembly is cushionably mounted to the lower mounting plate 43, which itself is mounted to the frame member 15 by a plurality of long bolts 50, which are passed through holes properly provided in the upper mounting plate 41, the upper foam block 44, the stiffener 45, the lower foam block 46 and the lower mounting plate 43. Placed over the long bolts 50 before they are fastened, are a plurality of springs 51 placed one over each long bolt 50 and restrained by the nuts 52.

It is contemplated that in some instances it may be desirable to have my one-piece seat 35 swivelly mounted for rotation. This can be accomplished by many methods of rotational mounting of seats well known in the art, and it is felt that such methods need not be described or illustrated herein except to mention that such rotational mounting most likely would take place by modifying the seat spacer 40 and upper mounting plate 41 by interposing a suitable mechanism therein (not shown) so that the seat spacer 40, to which the one-piece seat 35 is mounted, would rotate relative to the upper mounting plate 41. Of course, in this instance, the seat bolt and nut assemblies 39 would be shorter and would only fasten the seat 35 to the seat spacer 40, while the seat spacer 40 would be fixedly but rotatably mounted to the upper mounting plate 41.

Figure 5:
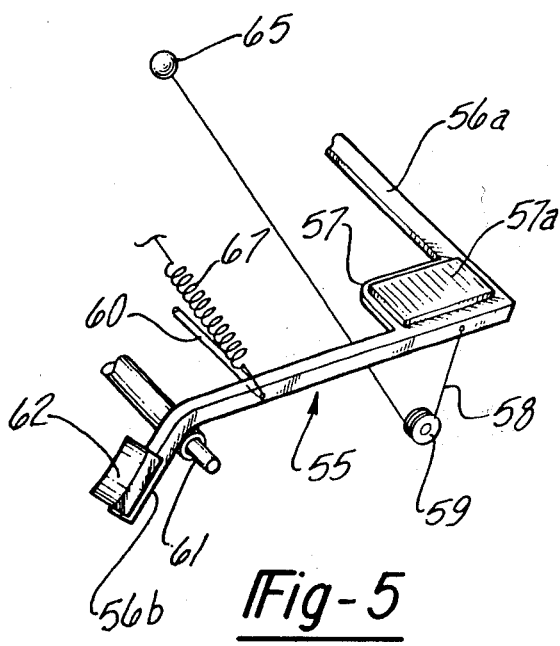
FIG. 5 is a fragmentary view showing the hand and foot operated brake means of my invention in greater detail.

Referring now to FIG. 5, there is shown an enlarged fragmentary view to aid in the illustration of the foot brake assembly. The entire foot brake assembly is generally designated by the numeral 55, and includes an upper portion 56A and a lower portion 56B. The foot brake assembly being pivotally mounted to the frame member 15 by suitable axle means 61 (FIG. 3).

Mounted to the lower portion 56B, are a pair of brake pads 62, which frictionally engage the wheels 24 when pressure is applied to the pedal pads 57A mounted on the pedal extensions 57 on the upper portion 56A of the foot brake assembly. To provide that the brake pads 62 are removed from contact with the wheels 24 when pressure is removed from the pedal pads 57A, a pair of brake assist springs 67 are operatively attached between the foot brake assembly 55 and the arm rail 18A of the arm rail and safety bar 18. The springs, in their normally contracted position, keep the brake pads 62 from engaging the wheels 24.

For safety purposes, I provide for operation of this brake by hand pressure by the child should the need arise during a condition of operation where he may be unable to operate the foot brake assembly by putting pressure on the pedal pads 57A. This is done by providing a brake cable 58, which is fixedly attached to the foot brake assembly 55, and passes around a pulley assembly 59 operatively attached to the one-piece floor board 65, which in this modification of my invention replaces the separate toe board 30 and floor board 31. The cable 58 then passes through a guideway 64 and is terminated by a ring 65 which is operable by the child.

To provide a stop to prevent the foot brake assembly 55 from being contracted by the brake assist springs 67 to such an extent that it will drag on the surface 38 on which my Kiddy-Cart is traveling, I provide a stop member 60 to prevent this occurrence.

Figure 6:
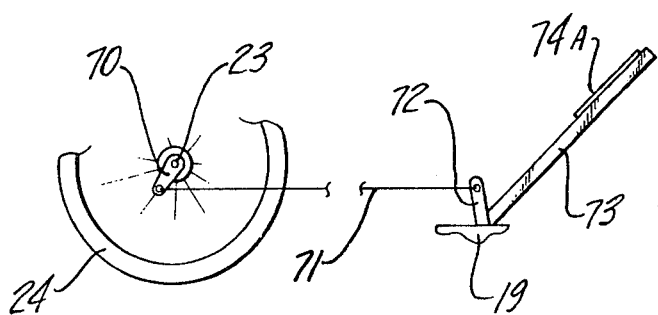
FIG. 6 is a fragmentary view showing a modified brake means whereby coaster brakes are used on the wheels of the construction embodying my invention.

Referring now to FIG. 6, a modified foot brake assembly is shown in which the brake pads 62 are replaced by coaster brakes 70. In this case, at least one coaster brake assembly is provided about the axle 23, and is connected by a cable 71 to an extension 72 on modified brake pedal 73, which, like the foot brake assembly 55, is pivotally mounted to the seat support bars 19. Again, a pedal portion 74 is provided for the child's feet to exert pressure on the pedal 73. Because of the nature of coaster brakes, when pressure is removed from the pad 74, the brakes will be released.

Figure 7:
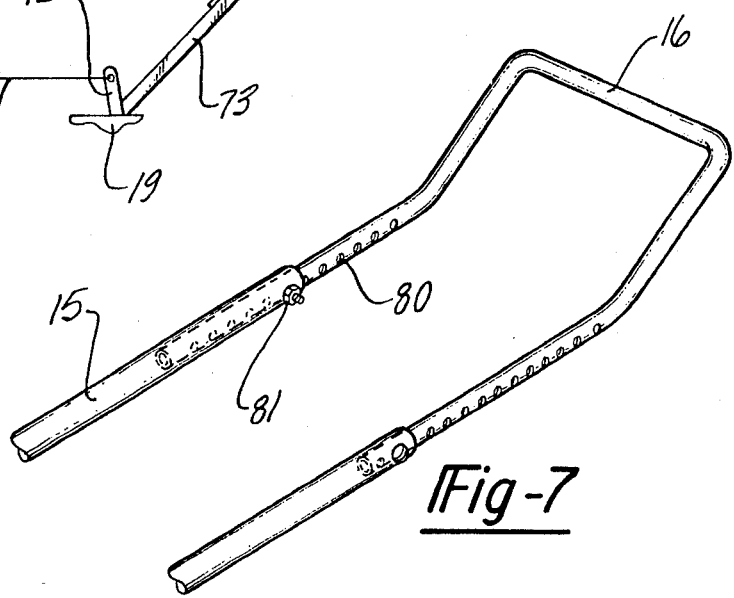
FIG. 7 is a fragmentary view showing how an adjustable twin tongue may be used in place of the fixed tongue shown in FIG. 3.

With reference to FIG. 7, it is shown how I provide for adjustment of my Kiddy-Cart to be pulled by children of different heights. It can be seen that the tongue section 16 is now made separately and telescopes inside the frame member 15. A plurality of holes, each of which may be designated by the numeral 80, are provided, through which tongue bolt and nut assemblies 81 pass to fasten the tongue 16 in any desired position. Other well known adjusting means can also be used. For ease of insertion, as shown in FIG. 6, one end of the tongue 16 is made longer than the other.

It should be understood that while I have shown my Kiddy-Cart generally constructed of a tubular material, and using bolts and nuts for ease of assembly, my construction can be made of any practicable material, having a wide variety of cross sections, and most of the bolt and nut assemblies could be replaced by other suitable fastening means, and be well within the scope of the present invention.

To complete the safety features of my invention, I provide a seat belt 82, which is to be worn by the child riding in the Kiddy-Cart, to provide that he will be safely restrained in the seat 35 should the cart traverse rough terrain.

A shoulder strap 83 may be provided, to be worn by the child or children pulling the cart to enhance their control thereof. It should be understood that although I have shown many safety features as being placed on the modification shown in FIG. 3 of the drawings, many of these modifications can also be used on the basic cart shown in FIG. 1.

Likewise, the skis 25 shown for use with the cart shown in FIG. 1, may just as easily be used with the modification shown in FIG. 3.

Thus, I have provided a children's safety pull toy having the necessary features for long and safe operation by children of all ages.

I claim:

1. A safety children's pull toy, including in combination:
   (a) a frame member having an adjustable telescoping tongue section to be grasped for the purpose of pulling said pull toy and a seat back support section;
   (b) an axle fixedly mounted to said frame member;
   (c) a pair of ground engaging means mounted to said axle;
   (d) a pair of arm rail and safety bars mounted to said frame member in a parallel-spaced relationship and adapted to limit rotation of said frame member about said wheels caused by lifting of said frame member by striking any surface which said pull toy is on after a predetermined amount of rotation;
   (e) a pair of seat support bars mounted in a generally horizontal parallel-spaced relationship between said frame member and said arm rail and safety bar;
   (f) a foot brake assembly pivotally mounted to said frame member;
   (g) a seat back fixedly mounted to said seat back support section of said frame member;
   (h) a seat fixedly mounted to said seat support bars;
   (i) a kick plate mounted to said arm rail and safety bars below said seat support bars;
   (j) a floor board mounted to said frame member adjacent said kick plate;
   (k) a toe board mounted to said frame member adjacent said forward end of said floor board;
   (l) a seat belt fixedly secured to said frame between said seat and said seat back to restrain the occupant of said pull toy; and
   (m) a shoulder strap fixedly attached to said tongue portion of said frame member to aid in the pulling and controlling of said pull toy.

2. The device defined in claim 1, and including a slip cover removably placed over said seat back.

3. The device defined in claim 1, and including a slip cover removably placed over said seat.

4. The device defined in claim 1, and wherein said ground engaging means comprise wheels rotatably mounted to said axle.

5. The device defined in claim 1, and wherein said ground engaging means comprise skis rotatably mounted to said axle.

6. A safety children's pull toy, including in combination:
   (a) a frame member including
      (aa) an adjustable telescoping tongue section adapted to be grasped for the purpose of pulling said pull toy; and
      (bb) a seat back support section:
   (b) an axle fixedly mounted to said frame member;
   (c) a pair of wheels rotatably mounted to said axle;
   (d) a pair of arm rail and safety bars mounted to said frame member in a parallel-spaced relationship and adapted to limit rotation of said frame member about said wheels caused by lifting of said frame member by striking any surface which said pull toy was on after a predetermined amount of rotation;
   (e) a pair of seat support bars mounted in a generally horizontal parallel-spaced relationship between said frame member and said arm rail and safety bar;
   (f) a lower mounting plate fixedly attached between said seat support bars and having a plurality of mounting holes provided therein;
   (g) a lower foam block mounted on top of said lower mounting plate and having corresponding mounting holes therein;
   (h) a stiffener mounted on top of said lower foam block and having corresponding mounting holes thereon;
   (i) an upper foam block mounted to said stiffener and having corresponding mounting holes thereon;
   (j) an upper mounting plate mounted to said upper foam block and having corresponding mounting holes thereon;
   (k) a plurality of long bolts passed seriatim through said upper mounting plate, said upper foam block, said stiffener, said lower foam block and said lower mounting plate;
   (l) a plurality of springs positioned over the lower end of said long bolts;
   (m) a plurality of nuts operatively attached to said long bolts and restraining said springs between said nuts and said lower mounting plate;
   (n) a one-piece seat construction;
   (o) a spacer plate fixedly mounted to said one-piece seat construction;
   (p) a plurality of fastening means fixedly attaching said one-piece seat construction and said seat spacer to said upper mounting plate;
   (q) a foot brake assembly pivotally mounted to said frame member; said foot brake assembly including:
      (aa) an upper portion including a pedal extension and pedal pads, and being pivotally mounted to said frame by suitable axle means;
      (bb) a lower portion having a pair of brake pads mounted thereon;
      (cc) a pair of brake assist springs mounted one on each side of said upper portion between said upper portion and said arm rail and safety bar;
      (dd) a stop member operatively mounted to said upper portion and adapted to stop excessive downward movement of said lower portion;
      (ee) a pulley assembly operatively mounted to a one-piece floor board;
      (ff) a cable operatively attached to said upper portion of said foot brake assembly, passing around said pulley assembly and entering a guideway; and
      (gg) a ring terminating said cable and adapted to have force exerted thereon to operate said foot brake assembly.

7. The device defined in claim 6, wherein said foot brake assembly includes:
   (a) a pair of coaster brakes mounted at each side of said axle;
   (b) a brake pedal rotatably mounted to said seat support bars;
   (c) an extension mounted to said brake pedal; and (d) a cable operatively connected to said coaster brake and said extension to operate said coaster brake when said brake pedal is pressed in the downward direction.

8. The device defined in claim 7, and including a one-piece floor board mounted to said frame member, adjacent said arm rail and safety bars.

9. The device defined in claim 8, and including a seat belt fixedly attached to said one-piece seat construction to retain the occupant of said pull toy.

10. The device defined in claim 9, and including a shoulder strap for use in aiding the control and pulling of said pull toy.

11. The device defined in claim 10, and including a pair of safety wheels mounted one each at the junction of said pair of seat support bars and said pair of arm rest and safety bars in a parallel-spaced relationship.

* * * * *